US005580537A

United States Patent [19]

Sextl et al.

[11] Patent Number: 5,580,537

[45] Date of Patent: Dec. 3, 1996

[54] PROCESS FOR THE COMPRESSION OF POWDERED SUBSTANCES

[75] Inventors: Gerhard Sextl, Geiselbach; Sabine Bartelt, Langenselbold; Klaus Wilmes, Freigericht-Bernbach; Roland Reuter, Darmstadt; Rudolf Schwarz, Alzenau-Wasserlos; Friedel Worch, Gelnhausen-Meerholz, all of Germany

[73] Assignee: Degussa Aktiengesellschaft, Frankfurt am Main, Germany

[21] Appl. No.: 426,586

[22] Filed: Apr. 21, 1995

Related U.S. Application Data

[63] Continuation of Ser. No. 207,699, Mar. 9, 1994, abandoned.

[30] Foreign Application Priority Data

Mar. 27, 1993 [DE] Germany .......................... 43 09 995.5

[51] Int. Cl.[6] ............................ C01B 31/02; C01B 33/12

[52] U.S. Cl. ......................... 423/335; 423/449.2; 264/101

[58] Field of Search ................................ 423/335, 449.2; 264/101

[56] References Cited

U.S. PATENT DOCUMENTS

| | | | |
|---|---|---|---|
| 1,372,190 | 3/1921 | Randall et al. | 100/90 |
| 2,937,421 | 5/1960 | Taccone | 164/161 |
| 3,094,384 | 6/1963 | Bertolacini et al. | 423/335 |
| 3,116,137 | 12/1963 | Vasilos et al. | 423/335 |
| 4,780,108 | 10/1988 | Razzano | 423/335 |
| 5,030,433 | 7/1991 | Mehrotra | 423/335 |

FOREIGN PATENT DOCUMENTS

| | | |
|---|---|---|
| 1904439 | 11/1970 | Germany . |
| 2-074086 | 10/1981 | United Kingdom . |

*Primary Examiner*—Gary P. Straub
*Assistant Examiner*—Timothy C. Vanoy
*Attorney, Agent, or Firm*—Cushman Darby & Cushman

[57] ABSTRACT

Powdered substances are compressed by a process wherein the powdered substances are enclosed in a flexible receptacle, the receptacle is enclosed in a pressure vessel and the space between the wall of the receptacle and the wall of the pressure vessel is pressurized with compressed gas.

3 Claims, 5 Drawing Sheets

PROCESS FOR THE COMPRESSION OF POWDERED SUBSTANCES

This is a continuation of application Ser. No. 08/207,699, filed on Mar. 9, 1994, now abandoned.

The present invention relates to a process for the compression of powdered substances to a given bulk density range while preserving the powdered structure of the powder.

BACKGROUND OF THE INVENTION

Commercial synthetic silicas which have been ground by steam jet or air jet such as, for example, precipitated silicas, have bulk densities of from 50 to 90 g/l and a drying loss of 2 to 8% by weight, depending on the conditions of production or storage. For many applications it is necessary to lower the water content to less than 1% by weight through well-known drying processes. However, some of these drying processes have a loosening effect on the silica powder, i.e., during drying the bulk density is lowered to a value of between 30 and 40 g/l. Subsequent measuring out and packing of the precipitated silica is possible only with difficulty because of its consequently greatly increased volume. The dried silica should therefore be compressed to a higher bulk density.

It is well known that powdered substances such as, for example, synthetic silicas can be compressed by means of drum compressors, compressor screws, press band filters and/or other devices. However, these devices have the disadvantage that bulk densities in the range of from 50 to 100 g/l cannot be achieved or are not reproducible. The compressed powders usually show undesirable inhomogeneities such as nodules or similar undesirable components. In many cases the compressed powder cannot be loosened up again and is thus in the form of scabs, lumps or clods. What is more, the known devices are costly and susceptible to wear.

SUMMARY OF THE INVENTION

The object of the present invention is to provide a process and a device for the compression of powdered substances to a desired bulk density range, wherein the powdered structure of the powder is preserved and composites formed through the agglomeration of the powder during compression, such as lumps, clods etc., are avoided or else crumble again without being subjected to considerable mechanical action.

These and other objects are achieved in a process for the compression of powdered substances to a given bulk density range while preserving the powdered structure. In that process, the powdered substance is hermetically enclosed in a receptacle having a flexible wall which is impermeable to gases; this receptacle is enclosed in a closed pressure vessel; the space between the outer wall of the pressure vessel and the receptacle is pressurized by means of compressed gas; the pressure is maintained for a definite period and then released and the powdered substance is optionally removed with the receptacle from the pressure vessel.

The receptacle having a flexible wall impermeable to gases may be a bag, a flexible tube sealed at the ends, a sack, packet or similar object. The external shape is of secondary importance. What is important is that its wall does not admit gas.

In the process according to the present invention, the receptacle containing the powdered substance is compressed from all sides (quasi-isostatic) during the rise in pressure in the pressure vessel until the pressures in the pressure vessel and the receptacle are equal, although there is no exchange of gases between the receptacle and the pressure vessel. The pressure on the receptacle also compresses the powdered substance to a smaller volume. On the release of the compressed air, the receptacle swells up to its original volume but the powdered substance retains the smaller volume. The processes of compression are shown schematically in FIG. 1 (phases 1 to 3).

The process according to the present invention may be applied to all known powdered substances which are compressible. It may advantageously be used for the compression of synthetic silicas such as precipitated silicas or pyrogenically produced silicas and/or carbon black. It may be used in particular for the compression of precipitated silicas that have been ground by air jet or steam jet.

The process according to the present invention has the advantage that a very homogeneously compressed powder is obtained. The degree of compression can be selectively controlled to a given bulk density range. The bulk density can in particular be selectively controlled in the range of from 50 to 95 g/l.

The invention also provides a device for the compression of powdered substances to a given bulk density range, while preserving the powdered structure of the powder. The apparatus comprises a preferably vertically arranged external pressure vessel which may have any cross section but, which, preferably, has a circular cross-section, which has a hermetically sealable opening at both the upper and lower sides of the cross-section and which is provided internally with a flexible, preferably tubular internal receptacle made of a material impermeable to gases and likewise open above and below. The apparatus includes means for introducing the powdered substance into the internal receptacle so that the pressure within the receptacle is the same as in said vessel.

In a preferred form of the present invention, the device may be arranged in a duct which carries the powdered substance. The compressed powder, which is a compacted body or composite, immediately after the compression process and which retains its shape, possibly as an inelastic deformation, after release of the applied pressure, may crumble again to powder without being subjected to considerable mechanical action, while the bulk density and structure of the powder is nearly unchanged.

The process according to the present invention and the device according to the present invention have the advantage that no mechanical parts are used to increase the pressure. Consequently no mechanical wear can appear in the device.

BRIEF DESCRIPTION OF FIGURES OF DRAWING

The invention will be better understood from the following Detailed Description of Preferred Embodiments and by reference to the drawings, wherein.

DETAILED DESCRIPTION OF PREFERRED EMBODIMENTS

EXAMPLE

Figure 1C:
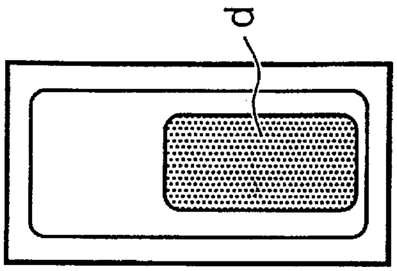
FIGS. 1A to 1C are schematic illustrations of the method for carrying out the invention, showing the successive stages of the process, before, during and after compression.
Figure 1B:
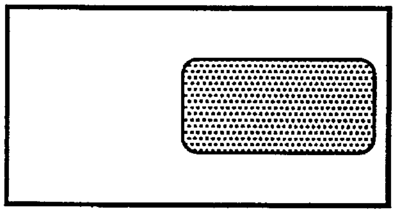
Figure 1A:
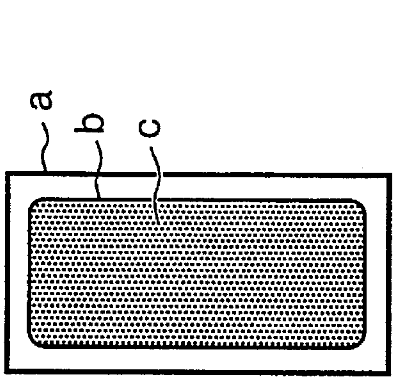

The precipitated silica FK 500 DS, produced by Degussa AG, Frankfurt, is used to carry out the example. This precipitated silica has the following physical and chemical properties:

| | | |
|---|---|---|
| Surface according to BET[1)] | $m^2/g$ | 450 |
| Average size of agglomerates | m | 3.5[8)] |
| Tamped density[2)] | g/l | 70 to 80 |
| Drying loss on leaving the supplier (2 h at 1000° C.)[3)] | % | 3 |
| Ignition loss (2 h at 1000° C.)[4)9)] | % | 5 |
| pH value (in 5% aqueous dispersion)[5)] | | 6.5 |
| DBP- absorption[6)9)] | g/100 g | 330 |
| $SiO_2$[10)] | % | 98.5 |
| $Na_2O$[10)] | % | 0.6 |
| $Fe_2O_3$[10)] | % | 0.03 |
| $SO_3$[10)] | % | 0.7 |
| Sieve residue (Mocker's test, 45 m)[7)] | % | 0.02 |

1)according to DIN 66 131
2)according to DIN ISO 787/XI, JIS K 5101/18 (not sieved)
3)according to DIN ISO 787/II, ASTM D 280, JIS K 5101/21
4)according to DIN 55 921, ASTM D 1208, JIS K 5101/23
5)according to DIN ISO 787/IX, ASTM D 1208, JIS K 5101/24
6)according to DIN 53 601, ASTM D 2414
7)according to DIN ISO 787/XVIII, JIS K 5101/20
8)Coulter counter, 50 m capillary
9)related to 2 hours at 105° C. of dried substance
10)related to 2 hours at 1000° C. annealed substance A cylindrical jet pressure vessel (autoclave) with a hemispherically shaped base and a volume of approximately 50 liters (Ø: about 300 mm by 700 mm long) is available for the tests. The pressure vessel can be closed with a detachable cover by means of 12 screws after insertion of a rubber seal. A pressure-measuring device and a ball valve are flange-mounted on the cover. Before opening, the autoclave can be completely expanded of air by means of the ball valve. The connection for the supply of compressed air is situated at the side of the steel cylinder. The autoclave is designed for a maximum operating pressure of approximately 10 bar; an adequate pressure relief valve is incorporated.

All tests are carried out with the precipitated silica FK 500 DS, which is available as a bagged product with a bulk density of 60 to 70 g/l. To be able to carry out the compression tests under conditions as they exist after the application of well-known drying processes, the silica is first ground up by means of a toothed disk mill pinned disk mill. The experiments are carried out with undried and then with dried silica. Essential data on the starting products are given in Table 1.

TABLE 1

| Property of precipitated silica | Loss of moisture/ drying loss % by weight[1)] | Bulk density (g/l) | Tamped density (g/l) |
|---|---|---|---|
| Undried | approx. 4 | 40 | 50 |
| Dried | 1 | 30 | 35 |

1)Conditions: 105° C./18 hours

The compression tests are commenced after grinding and optional drying of the FK 500 DS. For this purpose, polyethylene (PE) bags are first almost completely filled with the precipitated silica (originally weighed quantity: 1,200 g) and sealed. The dimensions of the bags are such that, when filled, the bags occupy approximately 80% of the volume of the autoclave (the distance between the PE bag and the wall of the autoclave is about 3 to 5 cm). A bag is placed in the autoclave, which is then closed.

The desired test pressure (1 bar to a maximum of 4 bar excess pressure) is set by careful opening and well-timed discontinuation of the compressed air supply. After the selected duration of time has elapsed (0.5 to 3 min), the autoclave is slowly expanded of air and then opened. After the compression tests, unlike the situation beforehand, the PE bag is only partly filled with precipitated silica. Following removal from the autoclave the compressed precipitated silica is present partly as powder and partly in the form of soft lumps. The lumps crumble to powder under low mechanical stress. Samples are taken from the compressed precipitated silica and the bulk density, tamped density and lump density of the samples are measured immediately.

The following tests are carried out on the compressed silica FK 500 DS.

a. Determination of the bulk density (volume measured: 200 $cm^3$)

b. Determination of the tamped density (volume measured: 200 $cm^3$, number of strokes: 1250) according to DIN ISO 787/XI, JIS K 5101/18 c. Determination of the lump density

Method: A test sample with definite external dimensions is cut out from a lump of suitable size by means of a thin-walled metal tube (internal Ø: 35 mm). The lump density can be calculated by approximation after the test sample has been weighed out.

d. Determination of the behavior of the compressed precipitated silica on loosening up Method 1: By measuring the tamped density following the free fall of the product through a tube (Ø: 7.5 cm; length: 80 cm) with an attached funnel into a receiving vessel.

Method 2: By measuring the tamped density following passage through a conveyor screw (Manufacturer: Gericke; Ø: 3.5 cm; length: 40 cm) and fall into a PE bag (height of fall: 30 to 40 cm).

Figure 2:
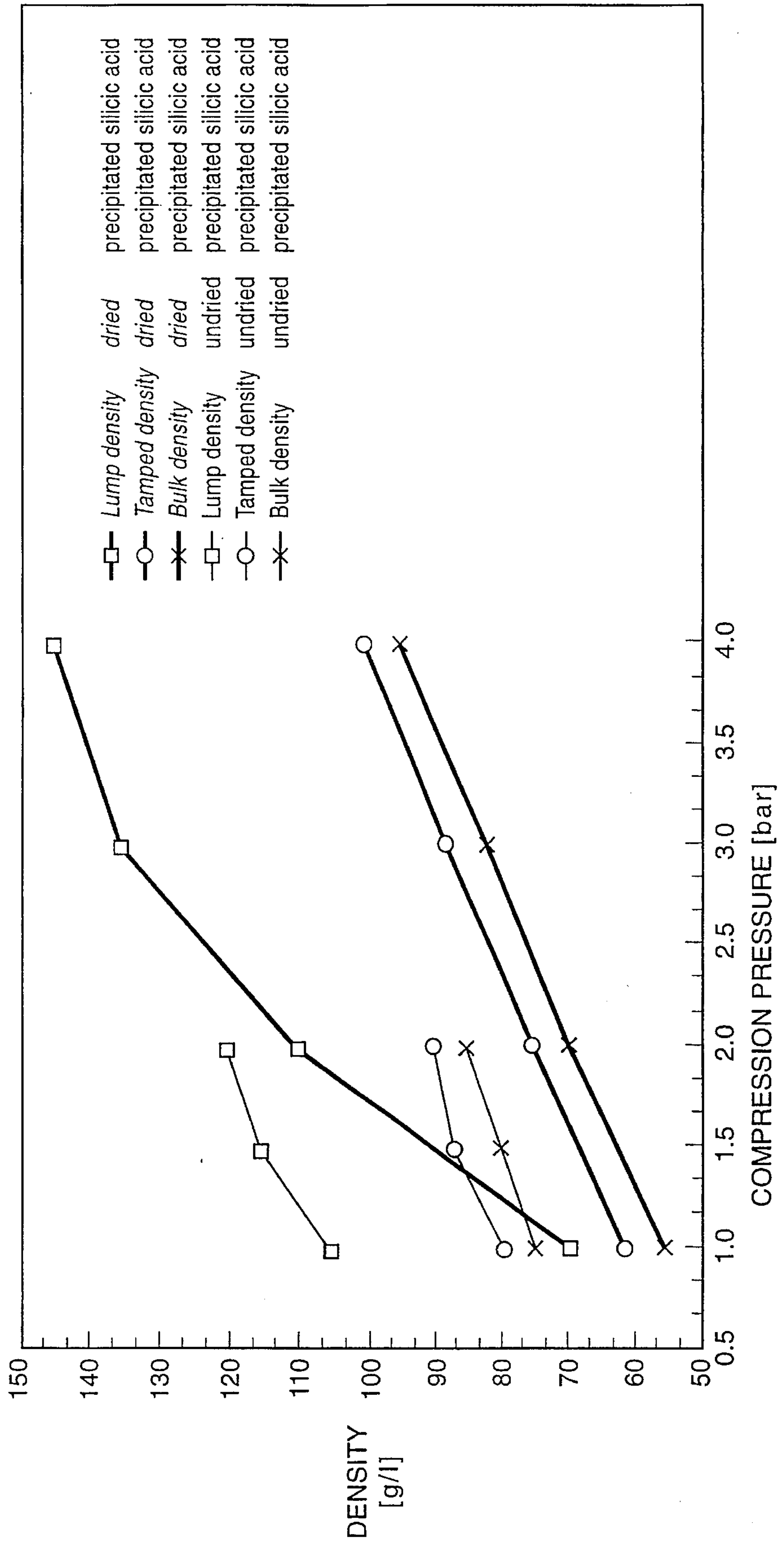
FIG. 2 is a graph showing the effect of compression pressure on density.

The following series of tests were carried out:

a. Test series A: degree of compression as a function of pressure b. Test series B: degree of compression as a function of duration of time of the test c. Test series C: degree of compression as a function of the originally weighed quantity d. Test series D: behavior of the compressed precipitated silica on loosening up The results of compressing FK 500 DS in a pressure vessel as a function of the pressure are summarized in Table 2(a) and (b), with the results for the undried and dried precipitated silica being shown separately. The results are represented graphically in FIG. 2.

TABLE 2(a)

| Precipitated silica: | | FK 500 DS | Undried |
|---|---|---|---|
| Originally weighed quantity (g): | | 1,200 | |
| Duration of time of test (min): | | 3 | |
| Excess pressure in autoclave (bar) | Bulk density (g/l) | Tamped density (g/l) | Lump density (g/l) |
| 1 | 75 | 80 | 105 |
| 1.5 | 80 | 87 | 115 |
| 2 | 85 | 90 | 120 |

TABLE 2(b)

| Precipitated silica: | | FK 500 DS | Dried |
|---|---|---|---|
| Originally weighed quantity (g): | | 1,200 | |
| Duration of time of test (min): | | 3 | |
| Excess pressure in autoclave (bar) | Bulk density (g/l) | Tamped density (g/l) | Lump density (g/l) |
| 1 | 56 | 62 | 70 |
| 2 | 70 | 75 | 110 |
| 3 | 82 | 88 | 135 |
| 4 | 95 | 100 | 145 |

The effect of the duration of time in the autoclave on the compression of FK 500 DS are given in Table 3 (a), (b), (c) and (d).

TABLE 3(a)

| Precipitated silica: | | FK 500 DS | Undried |
|---|---|---|---|
| Originally weighed quantity (g): | | 1,200 | |
| Compression pressure (bar): | | 1 | |
| Duration of time in autoclave (min) | Bulk density (g/l) | Tamped density (g/l) | Lump density (g/l) |
| 0.5 | 56 | 65 | 82 |
| 1.5 | 68 | 75 | 102 |
| 3.0 | 75 | 80 | 105 |

TABLE 3(b)

| Precipitated silica: | | FK 500 DS | Undried |
|---|---|---|---|
| Originally weighed quantity (g): | | 1,200 | |
| Compression pressure (bar): | | 1.5 | |
| Duration of time in autoclave (min) | Bulk density (g/l) | Tamped density (g/l) | Lump density (g/l) |
| 0.5 | 65 | 70 | 90 |
| 1.5 | 70 | 83 | 110 |
| 3.0 | 80 | 87 | 115 |

TABLE 3(c)

| Precipitated silica: | | FK 500 DS | Undried |
|---|---|---|---|
| Originally weighed quantity (g): | | 1,200 | |
| Compression pressure (bar): | | 2 | |
| Duration of time in autoclave (min) | Bulk density (g/l) | Tamped density (g/l) | Lump density (g/l) |
| 0.5 | 75 | 80 | 102 |
| 1.5 | 85 | 90 | 120 |
| 3.0 | 90 | 95 | 125 |

TABLE 3(d)

| Precipitated silica: | | FK 500 DS | Dried |
|---|---|---|---|
| Originally weighed quantity (g): | | 1,200 | |
| Compression pressure (bar): | | 4 | |
| Duration of time in autoclave (min) | Bulk density (g/l) | Tamped density (g/l) | Lump density (g/l) |
| 0.5 | 87 | 91 | 137 |
| 1.5 | 90 | 95 | 140 |
| 3.0 | 95 | 100 | 145 |

Figure 3:
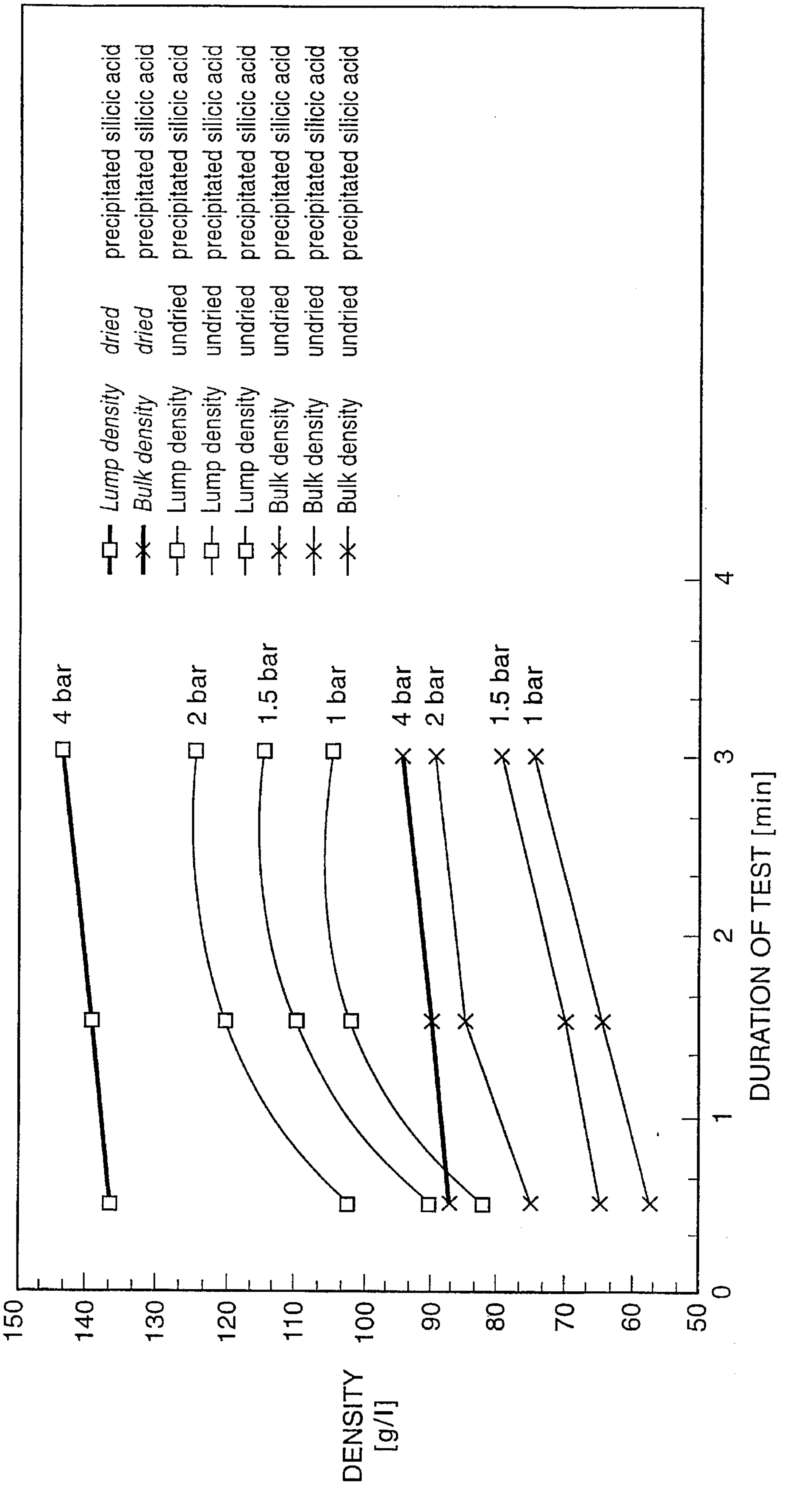
FIG. 3 is a graph showing the effect of the duration of the compression on the density.

The duration of time is varied for the undried precipitated silica at excess compression pressures of 1, 1.5 and 2 bar respectively; the behavior under compression in the dried precipitated silica FK 500 DS is investigated at 4 bar. The results are represented graphically in FIG. 3.

Figure 4:
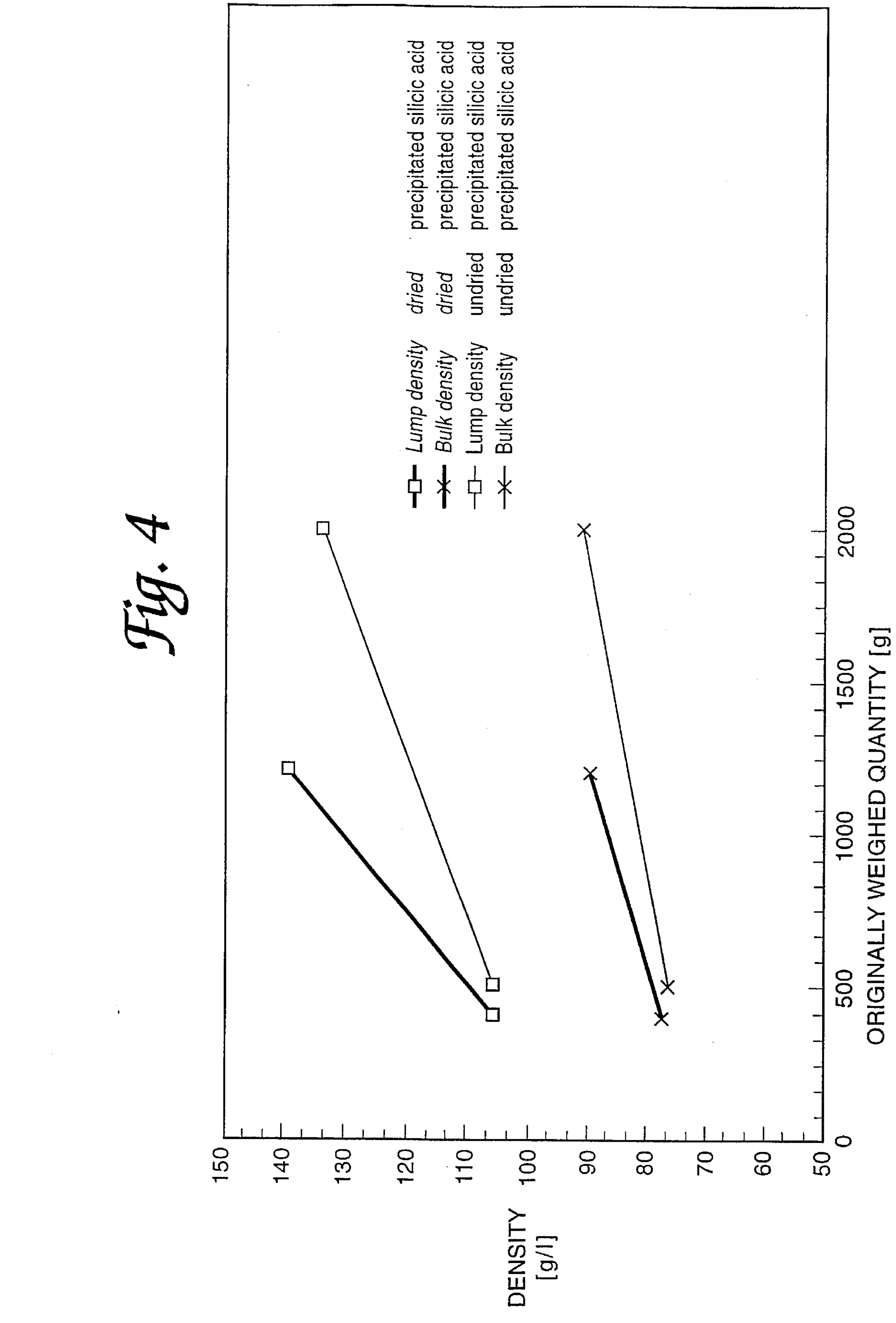
FIG. 4 is a graph showing the effect of the size of the sample being compressed on the density.

The results of the tests of the effect of the originally weighed quantity (filling of autoclave) on the compression of FK 500 DS are summarized in Table 4 (a) and (b). The compression conditions for undried FK 500 DS are 2 bar of excess pressure for a duration of time of 1.5 min and those for dried precipitated silica are 4 bar of excess pressure for a duration of time of 0.5 min. The parameters are selected so as to result in approximately comparable degrees of compression. The results are represented graphically in FIG. 4.

TABLE 4(a)

| Precipitated silica: | | FK 500 DS Undried | |
|---|---|---|---|
| Pressure (bar): | | 2 | |
| Duration of time of test (min): | | 1.5 | |
| Originally weighed quantity (g) | Bulk density (g/l) | Tamped density (g/l) | Lump density (g/l) |
| 500 | 76 | 82 | 105 |
| 2.500 | 94 | 102 | 135 |

TABLE 4(b)

| Precipitated silica: | | FK 500 DS | Dried |
|---|---|---|---|
| Compression pressure (bar): | | 4 | |
| Duration of time of test (min): | | 0.5 | |
| Originally weighed quantity (g) | Bulk density (g/l) | Tamped density (g/l) | Lump density (g/l) |
| 400 | 77 | 83 | 105 |
| 1,200 | 88 | 96 | 140 |

The following tests are carried out to investigate the behavior of the compressed precipitated silica FK 500 DS on loosening up (cf 3.3):

a. free fall of undried precipitated silica FK 500 DS through a tube with a funnel (length: 80 cm) placed in a receiving vessel.

b. passage of dried precipitated silica FK 500 DS through a Gericke conveyor screw (Ø: 3.5 cm; length: 40 cm) and subsequent fall into a PE bag (height of fall: 30 to 40 cm).

The results of the tests are summarized in Table 5.

TABLE 5

| Measure for loosening up | Silica properties | Bulk density range (compressed silica) prior to loosening up test (g/l) | Alteration in bulk density after loosening up test (g/l) |
|---|---|---|---|
| a. Free fall through tube | undried | <85 | −5 |
| | | >85 | ±0 |
| b. Metering screw | dried | <90 | −5 |
| | | >90 | ±0 |

By carrying out the tests, the following properties of FK 500 DS compressed according to the present invention are established.

a. In the bulk density range up to 90 g/l, the lumpy product formed during compression crumbles to powder merely on tapping; the lumps have substantially or essentially no mechanical strength.
b. In the bulk density range up to a compression limit of approximately 95 g/l, the lumpy product formed during compression crumbles to powder merely on tapping firstly to lumps, which in turn crumble easily to powder. The mechanical strength of the lumps has increased slightly as compared with a.

The results show that undried and dried FK 500 DS can be compressed to a controlled extent in a pressure vessel if the precipitated silica is previously sealed in a plastic (for example, polyethylene) bag.

The results can be summarized as follows.

a. Undried FK 500 DS can be compressed at lower pressures than can the dried precipitated silica.
b. The bulk densities for silica of from 50 to approximately 95 g/l can be attained reproducibly in dried precipitated silica by varying the pressure in the autoclave over the range of 1 to 4 bar.
c. For dried precipitated silica it is primarily the compression pressure that is critical to the result of compression; extended test durations result in an increase in bulk density of "only" approximately 3 g/l per minute.
d. At higher filling volumes (originally weighed quantity) of the pressure vessel with precipitated silica, greater degrees of compression are attained than with only partial filling.
e. The loosening up properties of undried and dried precipitated silica FK 500 DS are equal.
f. No inhomogeneities in the densities of the products can be found.

Figure 5:
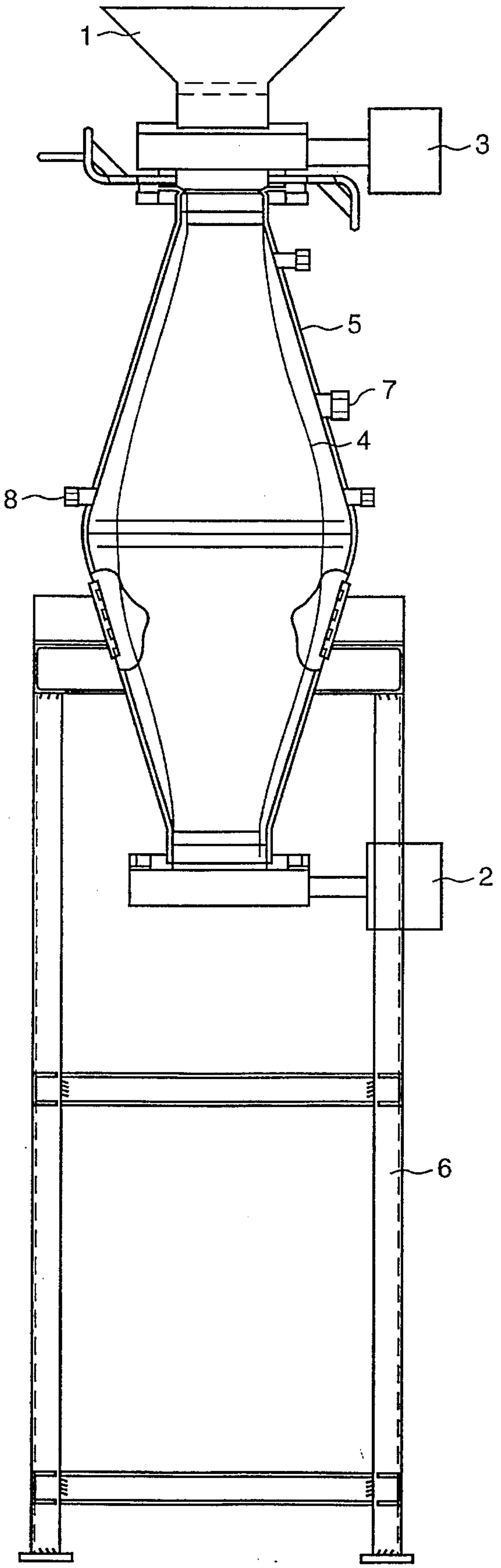
FIG. 5 is a side elevation, partially in section, of an apparatus for carrying out the invention.

FIG. 5 shows an example of carrying out the process according to the present invention and of the device according to the present invention. According to FIG. 5, the powdered substance is poured in through the funnel 1. The discharge valve (or discharge trap) 2 is shut during filling. The inlet valve (or inlet trap) 3 is shut after filling with the powdered substance. The powdered substance is contained in the space formed by the inlet valve 3, the discharge valve 2 and the compression membrane 4, which is made of rubber. The compression membrane 4 is tubular in shape and its measurements are accommodated to the interior space of the pressure vessel 5, which is mounted on the stand 6. Compressed air is now admitted through the connection 7 into the space between the compression membrane 4 and the wall of the pressure vessel 5 until a pressure of from 0.1 to 8 bar is established. This pressure is maintained for a further period of time. After a period of 0.1 to 10 minutes the compressed air is released through the exhaust valve 8. The discharge valve 2 is opened and the powdered substance is let out into the filling receptacle. Complete discharging can be attained by small thrusts of pressure into the space between the wall of the pressure vessel 5 and the compression membrane 4 with the discharge valve 2 open. When using the elastic compression membrane 4, its accommodation to the internal dimensions of the pressure vessel 5 should not be understood only in the absolute sense. The compression membrane 4 may be stretched according to the pressure relationship set up in the intermediate space (excess pressure or reduced pressure), so that the space enclosed by the compression membrane 4 becomes larger or smaller. With the use of the extensible compression membrane 4, the powder to be compressed can be sucked into the device through the inlet 1 with the inlet valve 3 open by setting up a reduced pressure in the intermediate space.

What is claimed is:

1. A process for the compression of powdered substances to a given bulk density range while preserving the powdered structure of the powder, said process comprising, hermetically enclosing the powdered substance in a single receptacle having a flexible wall which is impermeable to gases;

enclosing said receptacle in a closed pressure vessel;

pressurizing the space between the outer wall of the pressure vessel and the receptacle with compressed gas;

maintaining the pressure for a period of time sufficient to compress the powdered substance under quasi-isostatic conditions with no exchange of gases between the receptacle and the pressure vessel; and then releasing the pressure to obtain a compressed powdered product which has a higher tamped density than bulk density and is free from the presence of granulate while the receptacle swells up to its original volume.

2. A process as set forth in claim 1 including the step of removing the powdered substance and the receptacle from the pressure vessel.

3. A process as set forth in claim 1 in which the powdered substance is pyrogenically produced silica, precipitated silica or carbon black.

* * * * *